US009426620B2

(12) United States Patent
Xu et al.

(10) Patent No.: US 9,426,620 B2
(45) Date of Patent: Aug. 23, 2016

(54) DYNAMIC GEOHASH-BASED GEOFENCING (71) Applicant: Twitter, Inc., San Francisco, CA (US)

(72) Inventors: Sen Xu, San Francisco, CA (US); Krishna Kamath, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 6 days.

(21) Appl. No.: 14/212,980

(22) Filed: Mar. 14, 2014

(65) Prior Publication Data
US 2015/0264523 A1 Sep. 17, 2015

(51) Int. Cl.
| | |
|---|---|
| *H04M 1/66* | (2006.01) |
| *H04W 4/02* | (2009.01) |
| *G06Q 30/02* | (2012.01) |
| *H04L 29/08* | (2006.01) |
| *H04W 4/22* | (2009.01) |
| *H04W 4/20* | (2009.01) |

(52) U.S. Cl.
CPC ........... *H04W 4/021* (2013.01); *G06Q 30/0259* (2013.01); *G06Q 30/0261* (2013.01); *H04L 67/18* (2013.01); *H04W 4/025* (2013.01); *H04W 4/206* (2013.01); *H04W 4/22* (2013.01)

(58) Field of Classification Search
CPC .......... G06Q 30/0261; G06Q 30/0259; G06Q 30/0282; H04W 4/02; H04W 4/001; H04W 4/021; H04W 4/025; H04W 4/04; H04W 4/22; G06N 99/005; G06N 5/022; G06F 17/30864; G06F 17/30241; G06F 17/30705; G06F 17/30377; G06F 17/30598; G06F 17/30289; H04L 41/14
USPC ........... 455/404.1, 404.2, 456.1, 456.2, 456.3
See application file for complete search history.

(56) References Cited

U.S. PATENT DOCUMENTS

| | | | | |
|---|---|---|---|---|
| 2011/0151839 A1* | 6/2011 | Bolon | ................... | H04W 24/08 455/414.1 |
| 2011/0181591 A1* | 7/2011 | Benitez | ................... | G06T 19/20 345/426 |
| 2013/0023247 A1* | 1/2013 | Bolon | ................... | H04W 24/08 455/414.1 |
| 2014/0089913 A1* | 3/2014 | Aaronson | ................. | G06F 8/61 717/174 |
| 2014/0095296 A1* | 4/2014 | Angell | ............... | G06Q 30/0246 705/14.45 |
| 2014/0164118 A1* | 6/2014 | Polachi | ...................... | 705/14.57 |
| 2014/0172573 A1* | 6/2014 | Saurabh | ..................... | 705/14.58 |
| 2014/0274154 A1* | 9/2014 | Rana et al. | ................. | 455/456.3 |

OTHER PUBLICATIONS

International Search Report and Written Opinion issued in the Application No. PCT/US2015/020105, mailed Jun. 10, 2015 (14 pages).
Ulrich Bareth et al, "geoXmart—A Marketplace for Geofence-Based Mobile Services," Computer Software and Applications Conference (COMPSAC), 2010 IEEE 34th Annual, IEEE, Piscataway, NJ, USA, Jul. 19, 2010, pp. 101-106, XP031840940 (6 pages).
Anonymous, "Geohash," Wikipedia, the free encyclopedia, Nov. 14, 2012, XP055123567, URL: http://en.wikipedia.org/w/index.php?title=Geohash&oldid=523024733.

* cited by examiner

*Primary Examiner* — Jean Gelin
(74) *Attorney, Agent, or Firm* — Osha Liang LLP (57) ABSTRACT

A method and system for dynamic geohash-based geofencing within a geographic area including obtaining metadata including a campaign identifier and geometric data, generating a geometry using the geometric data, mapping the geometry to a geohash grid to obtain a first geohash set having a first geohash in the geohash grid, storing the first geohash and the campaign identifier in an entry in a geohash index, obtaining a user position within the geographic area from a mobile device, generating a user geohash using the user position, matching the user geohash to the entry in the geohash index, obtaining the campaign identifier from the entry in the geohash index, and providing content corresponding to the campaign identifier to the mobile device.

18 Claims, 8 Drawing Sheets

| Campaign Metadata | | |
|---|---|---|
| Entry 1 | Adam001 | (40.715, -74.009), 30 yards |

| Campaign Index | | |
|---|---|---|
| Entry 1 | Adam001 | dr5regu, dr5reuh |

| Geohash Index | | |
|---|---|---|
| Entry 1 | dr5regu | Adam001 |
| Entry 2 | dr5reuh | Adam001 |

DYNAMIC GEOHASH-BASED GEOFENCING

BACKGROUND

Location-based advertising is commonly used by vendors and service providers to reach consumers within a specified range of a target location.

SUMMARY

In general, in one aspect, embodiments of the invention provide a method for dynamic geohash-based geofencing within a geographic area including obtaining metadata including a campaign identifier and geometric data, generating a geometry using the geometric data, mapping the geometry to a geohash grid to obtain a first geohash set having a first geohash in the geohash grid, storing the first geohash and the campaign identifier in an entry in a geohash index, obtaining a user position within the geographic area from a mobile device, generating a user geohash using the user position, matching the user geohash to the entry in the geohash index, obtaining the campaign identifier from the entry in the geohash index, and providing content corresponding to the campaign identifier to the mobile device.

In general, in one aspect, embodiments of the invention provide a system for dynamic geohash-based geofencing within a geographic area, including memory and a computer processor for executing a dynamic geofencing application stored in memory and causing the computer processor to obtain metadata including a campaign identifier and geometric data, generate a geometry using the geometric data, map the geometry to a geohash grid to obtain a first geohash set having a first geohash in the geohash grid, store the first geohash and the campaign identifier in an entry in a geohash index, obtain a user position within the geographic area from a mobile device, generate a user geohash using the user position, match the user geohash to the entry in the geohash index, obtain the campaign identifier from the entry in the geohash index, and provide content corresponding to the campaign identifier to the mobile device.

In general, in one aspect, embodiments of the invention provide a computer readable medium storing instructions for dynamic geohash-based geofencing within a geographic area, the instructions comprising functionality to obtain metadata including a campaign identifier and geometric data, generate a geometry using the geometric data, map the geometry to a geohash grid to obtain a first geohash set having a first geohash in the geohash grid, store the first geohash and the campaign identifier in an entry in a geohash index, obtain a user position within the geographic area from a mobile device, generate a user geohash using the user position, match the user geohash to the entry in the geohash index, obtain the campaign identifier from the entry in the geohash index, and provide content corresponding to the campaign identifier to the mobile device.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for geofencing in order to provide notifications to or receive notifications from desired targets within the bounded regions of a geofence for various purposes, including advertising or promotional campaigns, event invitations, or movement alerts. More specifically, embodiments of the invention provide a method and system for dynamic geofencing, allowing the targeting of mobile devices within delimited areas that may change over time. The delimited areas may be expressed in geometries, each including one or more global positions. Additionally, embodiments of the invention implement dynamic geofencing and associated geometries using geohashes, which are character string representations of bounding boxes that approximate the global positions contained within.

Figure 1:
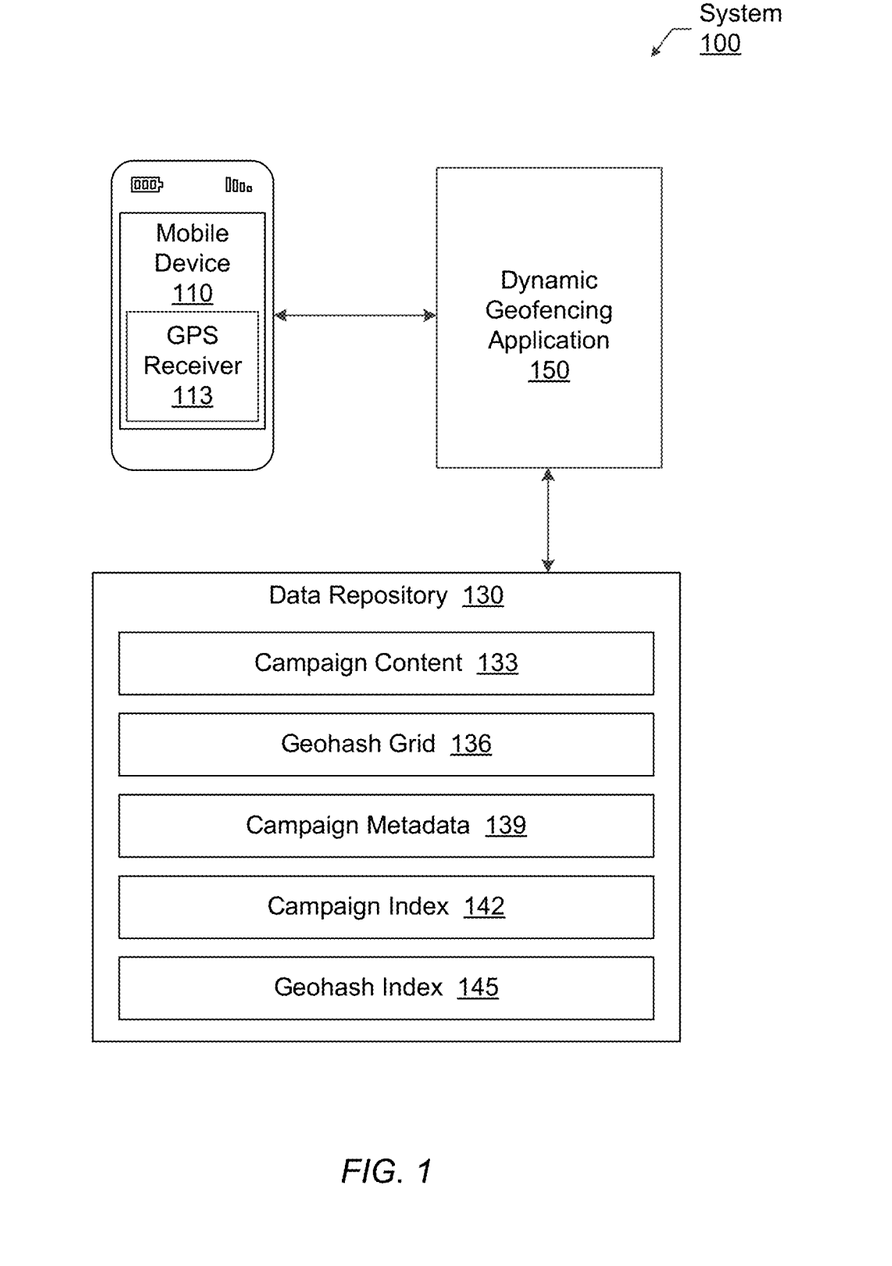
FIG. 1 shows a computing system in accordance with one or more embodiments of the invention.

FIG. 1. shows a system in accordance with one embodiment of the invention. As shown in FIG. 1, the system (100) has multiple components including a mobile device (110), a data repository (130), and a dynamic geofencing application (150).

In one or more embodiments of the invention, the mobile device (110) is a hardware mobile device capable of executing software (e.g., a mobile application). Examples of a mobile device may include, but are not limited to, a smartphone, a laptop computer, a tablet computer, a PDA, a navigation device, a wearable device (e.g., a smart watch, Google® Glass), a netbook computer, a computer embedded in a vehicle (e.g., embedded computer in a car) or any other computing device that is designed to be moved during normal use.

In one or more embodiments of the invention, the mobile device (110) includes a global positioning system receiver (113). The global positioning system ("GPS") receiver is any combination of software, firmware, and/or hardware that executes on the mobile device to track the global position of the mobile device. The GPS receiver may be resident on the mobile device, or via a wireless connection with another source of GPS information, for example, a mobile access point. In one or more embodiments of the invention, the GPS receiver includes functionality to provide to the mobile device positions in GPS coordinate format detailing the global position of the mobile device. The mobile device may include other functionality to determine the location of the mobile device aside from a GPS receiver, without departing from the invention. For example, if the mobile device is connected to a network, the mobile device may include functionality to obtain its Internet Protocol (IP) address and convert the IP address to GPS coordinates.

In one or more embodiments of the invention, the data repository (130) is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. The data repository may be stored, for example, on the mobile device (110) and/or on a server.

In one or more embodiments of the invention, the data repository is configured to store campaign content (133), one or more geohash grids (136), campaign metadata (139), one or more campaign indexes (142), one or more geohash indexes (145), and/or any other data relevant to geofencing and geohash-related applications. Each of these components is described below.

In one or more embodiments of the invention, campaign content (133) includes any information (including images, text, video, and/or audio content) associated with one or more campaigns. For example, for a particular ad campaign, the associated campaign content may include a campaign identifier and an advertisement for a particular company and/or brand. Alternatively, or additionally, in one or more embodiments, campaign content may include user generated content, e.g., content generated and posted by another user on a social media platform. For example, the campaign, with which the campaign content is associated, may correspond to promoting content from specific users on the social media platform. In another example, consider a scenario in which user A creates content A on a social media platform and that there is a campaign to promote the content of user A, when user B is located within a geofence that is associated with the aforementioned campaign, content A may be displayed (or otherwise provided) to user B. Alternatively, or additionally, the campaign may correspond to notification when a particular activity or event occurs (see example below). The campaign and/or campaign content is not limited to the above examples; rather, embodiments of the invention may be used to provide any type of content (in any form) to one or more users using one or more embodiments of the invention. In one or more embodiments of the invention, the campaign identifier ("campaign ID") may be any numeric, alphanumeric and/or symbolic string used to identify a given campaign.

In one or more embodiments of the invention, a geohash grid (136) may subdivide a given geographic area into cells of identical (or substantially similar) size and/or cells of differing size. Each cell in the geohash grid is defined by an alphanumeric string called a geohash. For example, the area roughly encompassing greater New York City may be associated with a geohash value of "dr5".

Campaign metadata (139), campaign indexes (142), and geohash indexes (145) are detailed in the following discussion of FIGS. 2-4. Discussion of FIG. 1 resumes thereafter.

Figure 2:
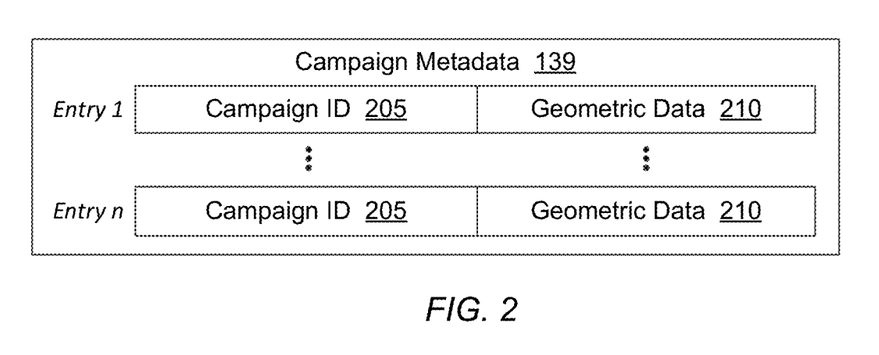
FIG. 2 shows a data structure in accordance with one or more embodiments of the invention.

FIG. 2 shows a data structure for storing campaign metadata (139) in accordance with one or more embodiments of the invention. Generally, campaign metadata may include any information related to geofences corresponding to one or more campaigns. In one or more embodiments of the invention, campaign metadata may include, for each campaign, an entry including the campaign ID (205) and geometric data (210). Geometric data (210) may specify a contiguous or non-contiguous geographic location and configuration of one or more areas that make up the original (non-geohashed) geofence associated with the campaign. Geometric data may include one or more global positions, for example, GPS coordinates, postal addresses, and/or other geographic identifiers. The one or more positions forming the geometries may be designated as one or more points, lines, or polygons. Geometric data (210) may include a buffer designating a desired distance (e.g., radius) surrounding the one or more geometries. The invention is not limited to the data structure shown in FIG. 2. In one or more embodiments of the invention, the one or more entries in the campaign metadata (139) may include the same or at least partially overlapping geometric data. Said another way, the geometric data in different metadata campaign entries may refer to the same physical locations. The overlapping of geometric data may allow multiple campaigns to be associated with the same physical location.

Figure 3:
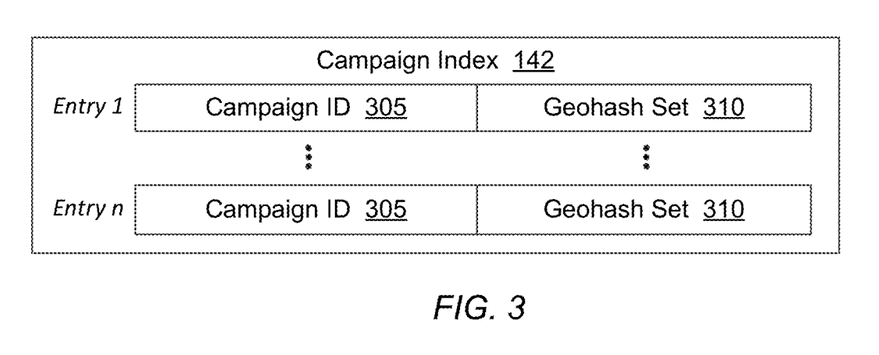
FIG. 3 shows a data structure in accordance with one or more embodiments of the invention.

FIG. 3 shows a data structure for storing a campaign index (142) in accordance with one or more embodiments of the invention. The data structure may be a hash table or any other type of associative array; accordingly, an entry in the campaign index may include a key-value pair. In one or more embodiments of the invention, the campaign index may include, for each campaign, an entry that includes the campaign ID (305) and a geohash set (310). In one or more embodiments of the invention, for each campaign, the geohash set (310) may include the one or more geohashes that, taken together, wholly encompass the geometries indicated for that campaign in the campaign metadata. In alternative embodiments, the geohash set may only include those geohashes that are themselves wholly encompassed by the indicated geometries. The invention is not limited to the data structure shown in FIG. 3.

Figure 4:
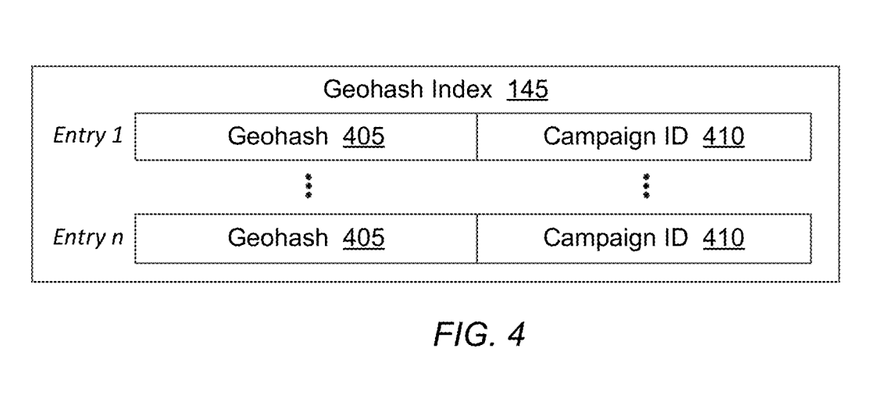
FIG. 4 shows a data structure in accordance with one or more embodiments of the invention.

FIG. 4 shows a data structure for storing a geohash index (145) in accordance with one or more embodiments of the invention. The data structure may be a hash table or any other type of associative array; accordingly, an entry in the geohash index may include a key-value pair. In one or more embodiments of the invention, the geohash index may include the same information contained in the campaign index, but arranged by geohash rather than by campaign ID. In other words, the geohash index may include an entry for each geohash appearing in a geohash set in the campaign index, the entry includes the geohash (405) and the corresponding campaign ID (410). The invention is not limited to the data structure shown in FIG. 4.

Returning to FIG. 1, in one or more embodiments of the invention, the dynamic geofencing application (150) may be any combination of hardware, software, and/or firmware, and may include functionality to obtain a geohash grid for a geographic area (which may be of any size and/or dimension). The geographic area may be, for example, the planet Earth, the United States of America, or the city of Tokyo. The geohash grid may be obtained from the data repository, from an external source, or it may be generated by the dynamic geofencing application ("DGA") itself.

In one or more embodiments of the invention, the DGA may include functionality to generate one or more geometries using the campaign metadata. For example, if the campaign metadata indicates a point coordinate and a 2 mile radius, the DGA may calculate the circumference and/or the area encompassed by the indicated circle.

In one or more embodiments of the invention, the DGA may include functionality to map one or more geometries or geometric data to a geohash grid to obtain a set of geohashes. After the geometries have been generated, the DGA may overlay the geometries onto the geohash grid in order to determine which cells in the geohash grid intersect the generated geometries.

In one or more embodiments of the invention, the DGA may include functionality to write data to, and read data from, a data repository (e.g., 130 in FIG. 1). The DGA may include functionality to read or erase values from the various data structures in the data repository using a lookup key; for example, the DGA may retrieve a geohash list from the campaign index by sending the corresponding campaign ID.

In one or more embodiments of the invention, the DGA may include functionality to obtain one or more positions of a mobile device within a geographic area. Each position may be in one of a number of formats including, for example, a GPS coordinate set, postal address, or zip code. Positions may be current or previous positions and may be obtained directly from the mobile device, from the data repository, or from any external source.

In one or more embodiments of the invention, the DGA may include functionality to generate a geohash using a geographic coordinate set. A set of geographic coordinates may be converted to a geohash using one of a number of different algorithms. In one such algorithm, for example, a geohash is obtained by interleaving the bits of the latitude and longitude of a coordinate-formatted position and encoding the result in base 32 to create a convenient string representation (i.e. the geohash) that can be expressed using five bits of data. In other embodiments, the geohash may be generated by encoding the interleaved bits of the position in another format, for example, base 36.

In one or more embodiments of the invention, the DGA may include functionality to match a geohash value to the geohash field of an entry in the geohash index. The geohash value may be generated from the position (e.g., expressed as geographic coordinates) of a mobile device using an algorithm similar to the one detailed above.

In one or more embodiments of the invention, the DGA may include functionality to communicate with external entities (e.g., the mobile device, a remote server, etc.). In one or more embodiments of the invention, the DGA may execute on a mobile device. The DGA may include the necessary application programming interface ("API") and/or any number of other components used for communicating with entities outside of the system. The API can include any number of specifications for making requests from and/or providing data to the system. For example, a function of the API may provide campaign content to a requesting mobile device within the geofence associated with the campaign.

In one or more embodiments of the invention, the functionality of the DGA may be divided (or otherwise split) between the mobile device and other external entities (e.g., a remote server).

While FIGS. 1-4 show a configuration of components, other configurations may be used without departing from the scope of the invention. For example, various components may be combined to create a single component. As another example, the functionality performed by a single component may be performed by two or more components.

Figure 5A:
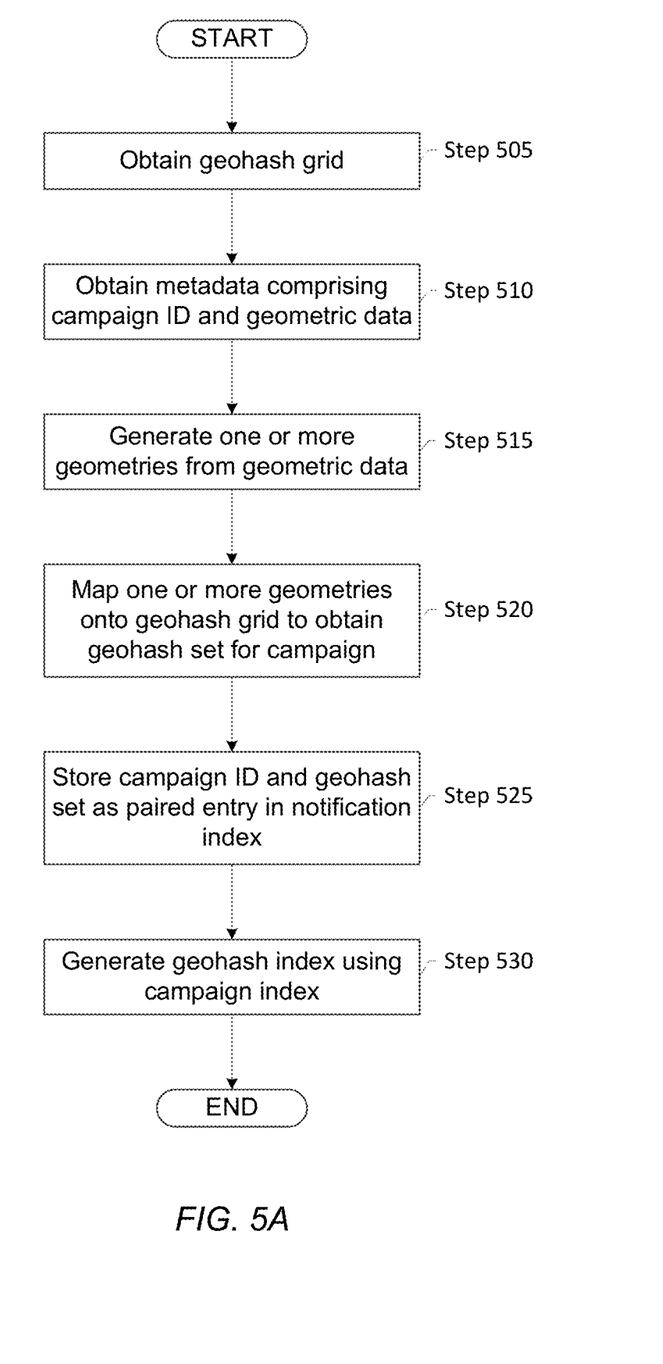
FIG. 5A shows a flowchart in accordance with one or more embodiments of the invention.
Figure 5B:
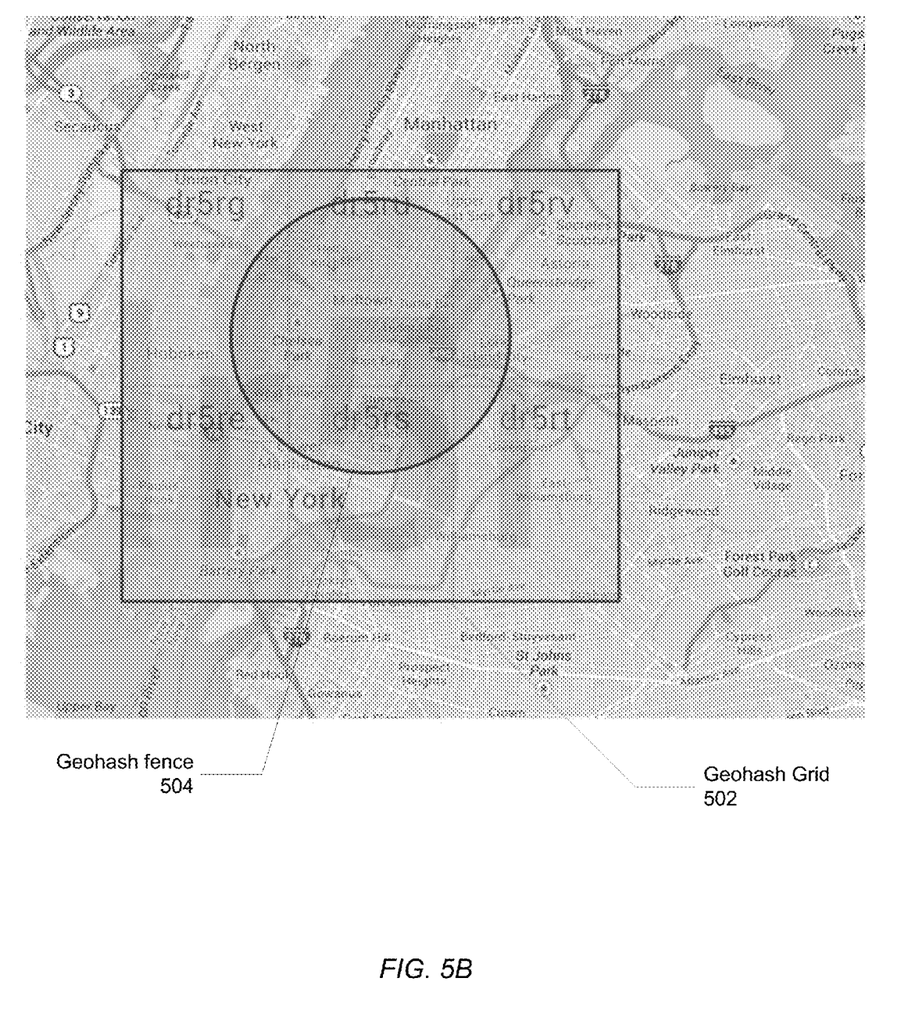
FIG. 5B shows a map in accordance with one or more embodiments of the invention.
Figure 6:
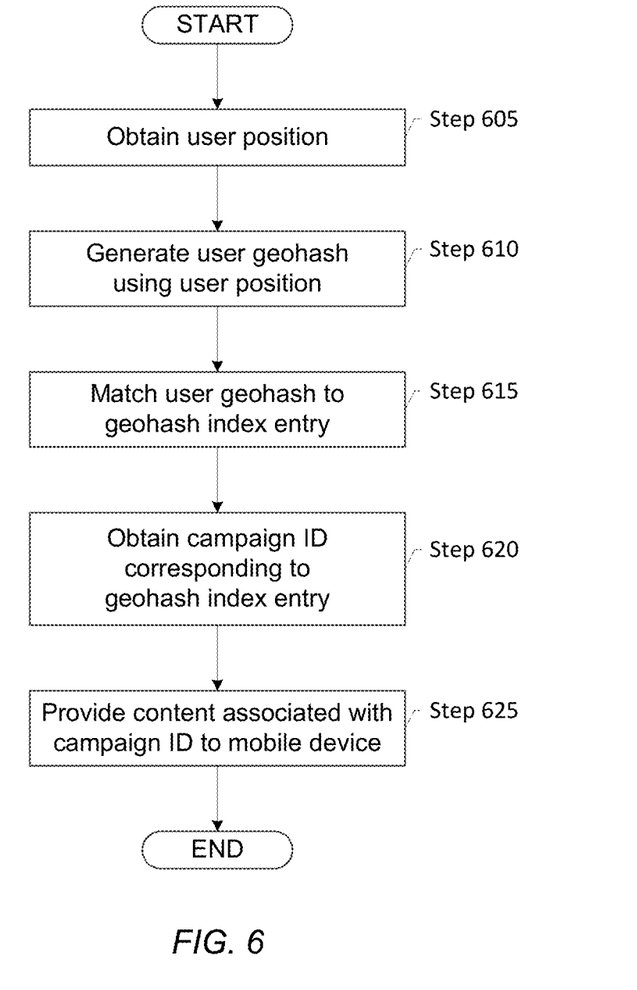
FIG. 6 shows a flowchart in accordance with one or more embodiments of the invention.
Figure 7:
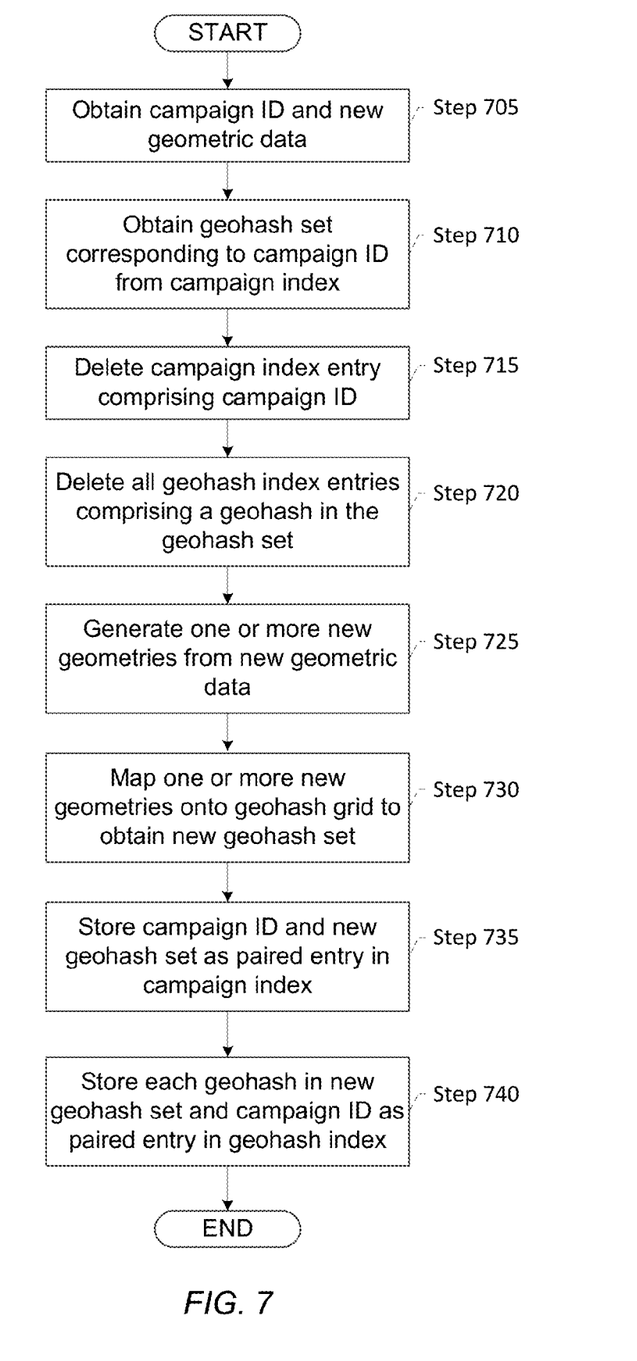
FIG. 7 shows a flowchart in accordance with one or more embodiments of the invention.
Figure 8:
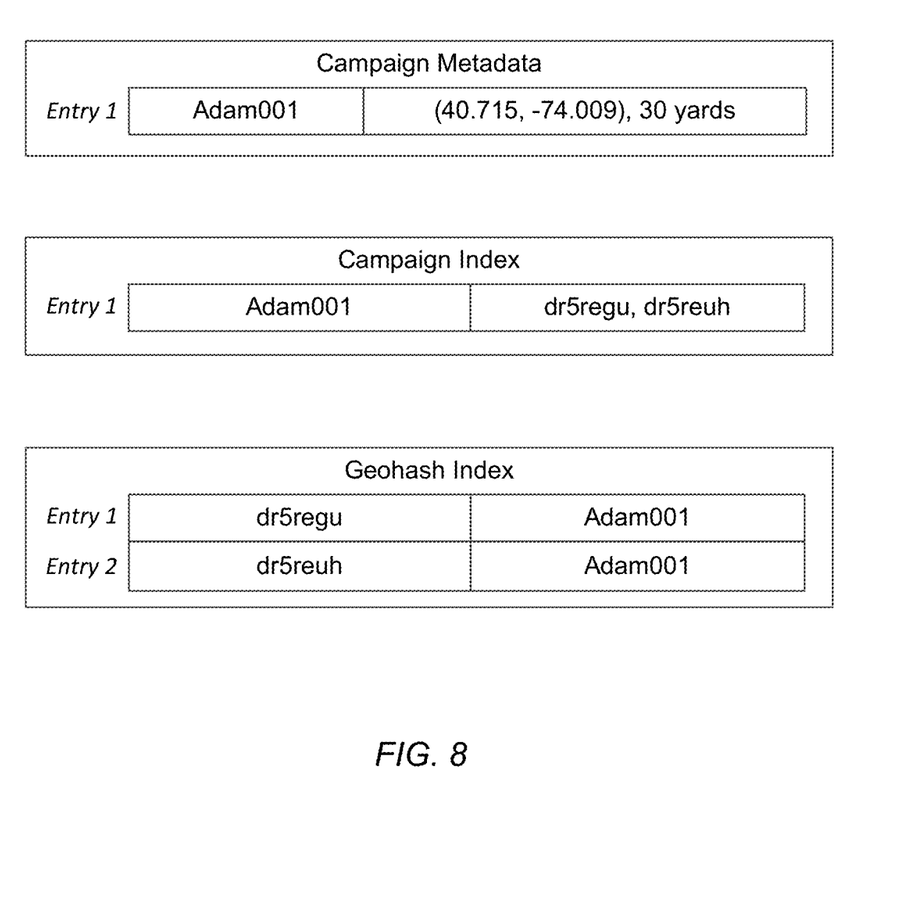
FIG. 8 shows an example in accordance with one or more embodiments of the invention.

FIGS. 5-7 show flowcharts in accordance with one or more embodiments of the invention. While the various steps in these flowchart are presented and described sequentially, one of ordinary skill will appreciate that some or all of the steps may be executed in different orders, may be combined or omitted, and some or all of the steps may be executed in parallel.

FIG. 5A shows a flowchart for generating a geohash index in accordance with one or more embodiments of the invention. The process shown in FIG. 5A may implemented, for example, by the system of FIG. 1 to generate the geohash index.

In Step 505, a geohash grid is obtained. The granularity (i.e., cell size) of the geohash grid may be predetermined to offer a desired level of precision or to facilitate resource-efficient operation of the system. For example, using a geohash grid having a finer granularity will yield a more precise geofence including a greater number of geohashes, each includes a longer character string. Alternatively, using a geohash grid having a coarse granularity will require less disk space to store a geofence generated from the grid, at the cost of losing precision.

The granularity of the geohash grid may be based, in part or in whole, on the population density of the geographic area. For example, it may be desirable for an ad campaign to have a larger geofence in sparsely populated areas, to reach a greater number of potential consumers; additionally, in such locations consumers may be more likely to travel a greater distance for a bargain. Rather than having to set geometries of differing sizes, a vendor may simply specify a uniform geometry for multiple positions, and using a density-granular geohash grid, the size of each corresponding geofence will vary accordingly.

In Step 510, campaign metadata is obtained that includes a campaign ID and geometric data. As an example, a single entry in the campaign metadata may provide: (i) "STARBUCKS001" for the campaign ID; (ii) the coordinates (40.715, −74.009) and (37.777, −122.416) for the geometries; and (iii) 10 miles for the buffer.

In Step 515, one or more geometries are generated from the geometric data obtained in Step 510. Geometries generated from the exemplary data in the previous step may vary depending on whether the data are indicated as points or a line. For example, in the first instance, the resulting geometries may be two circles, each centered at one of the listed positions and having a 10 mile radius. In the second instance, the resulting geometry may be an oblong centered on the line connecting the listed positions, having a width of 20 miles and a length of 20 miles plus the distance between the two positions.

In Step 520, the one or more geometries are mapped onto the geohash grid to obtain a geohash set for the campaign. The set of geohashes obtained by the DGA may include all geohashes corresponding to cells positioned entirely within the geometries and/or all geohashes corresponding to cells positioned partly within the geometries.

In Step 525, the campaign ID obtained in Step 510 and the geohash set obtained in Step 520 are stored as a paired entry in a campaign index. The campaign index may be a hash table including key-value pairs. For example, a given campaign index entry may have the following two fields: "AMEX002" as the entry's key or campaign ID and "dr5r, dr5s" as the entry's value or geohash set.

In Step 530, a geohash index is generated using the campaign index. A new geohash index entry may be generated for each geohash in the geohash set of a given campaign index entry, including the geohash as the new entry's key and the campaign ID as the new entry's value. Geohash index entries resulting from the exemplary data in the previous step may appear as follows: (1) "dr5r"/"AMEX002"; and (2) "dr5s"/ "AMEX002". After Step 530 is completed, the process proceeds to end.

FIG. 5B shows a map including an exemplary geohash grid and an exemplary geometry in accordance with one or more embodiments of the invention and Steps 505, 515, and 520, discussed above with respect to FIG. 5A. More specifically, overlaid on the map is a geohash grid (502). Further, a geohash fence (504) is overlaid on the geohash grid.

FIG. 6 shows a flowchart for providing campaign content to a mobile device within a geofence in accordance with one or more embodiments of the invention. The process shown in FIG. 6 may be implemented, for example, by the system of FIG. 1 to provide the ad campaign content.

In Step 605, a user position within the geographic area is obtained. For example, the position of a user's mobile device may be obtained from a GPS receiver resident on the mobile device, or through IP-to-coordinate conversion. Multiple positions may be obtained at once or over a predetermined time interval and from one or more devices. As an example, the global positions of multiple mobile devices in a specific time zone may be obtained from those devices once an hour between the hours of 8 a.m. and 8 p.m. The positions may be scraped from Internet messaging services. For example, all user posts on a particular social media platform posted at 12:01 p.m. may be scraped to provide the embedded positions of those users at that specific time. The user's position within a geographic area may be obtained using other mechanisms without departing from the invention. As another example, the position of a mobile device may be obtained by the user's service provider through mobile tracking means such as triangulation using cellular base stations.

In Step 610, a user geohash is generated using the user position obtained in Step 605. If the obtained position is in a format other than a coordinate set, for example, a street address or a zip code, the position may be converted to a coordinate format before a geohash is generated. The length of the generated geohash may depend on the precision of the position obtained. For example, converting a coordinate having 20 decimal places will generate a longer geohash than converting a coordinate having 10 decimal places. Additionally, the generated geohash may be truncated to a predetermined length.

In Step 615, the user geohash is matched to a geohash index entry. The system may make an identical match, in which case it is determined that the geohash value is equivalent to the contents of a geohash field (i.e., a key) in the geohash index entry. Alternatively, the system may perform a prefix match, in which case it is determined that a truncation of the geohash value is equivalent to the contents of the geohash field in a geohash index entry. This alternative would be necessary where the geohash grid has a coarse granularity and the geohash generated from the position has a large number of decimal places.

In Step 620, the campaign ID corresponding to the matching geohash index entry is obtained. The campaign ID is the value of the matching geohash index entry.

In Step 625, content associated with the campaign ID is provided to the mobile device. The content may be retrieved from the data repository and may be modified to conform to the specifications of the mobile device.

After Step 625 is completed, the process proceeds to end.

FIG. 7 shows a flowchart for updating information in campaign and geohash indexes in accordance with one or more embodiments of the invention. The process shown in FIG. 7 may be implemented, for example, by the system of FIG. 1 to update the geohash index.

In Step 705, a campaign ID and new geometric data are obtained. The campaign ID and new geometric data may be obtained in the same fashion as in Step 510.

In Step 710, the geohash set corresponding to the campaign ID is obtained from the campaign index. The geohash set may be obtained by using the campaign ID as a key lookup in the campaign index.

In Step 715, the entry including the campaign ID is deleted from the campaign index. Both the campaign ID and the geohash set corresponding to the campaign ID may be deleted.

In optional Step 720, all geohash index entries including a geohash in the geohash set are modified by deleting the campaign ID from the entry. This step may be executed by first identifying each geohash in the geohash set obtained in Step 710. The geohashes may then be individually used as key lookups to identify and delete the campaign ID from each entry corresponding to a geohash in the geohash set. If no other campaign IDs remain in the entry after deleting the campaign ID from Step 705, then the value for the entry may be set to NULL or the entry may be deleted in its entirety. Step 720 may be necessary if, in Step 740, the pre-existing geohash index is retained and modified rather than replaced by a new geohash index.

In Step 725, one or more new geometries are generated from the new geometric data. The geometries are generated in the same fashion as in Step 515.

In Step 730, the one or more new geometries are mapped onto a geohash grid to obtain a new geohash set. The geohash grid may be the same or a different geohash grid obtained in Step 505, but the geometries may be mapped onto the geohash grid in the same fashion as in Step 520.

In Step 735, the campaign ID and the new geohash set are stored as a paired entry in the campaign index. The campaign ID and geohash set may be stored as a key and a value, respectively, in the same fashion as in Step 525.

In Step 740, a new geohash index is generated using the campaign index. The geohash index may be generated in the same fashion as in Step 530. Alternatively, each geohash in the new geohash set and the campaign ID may be stored as a paired entry in old geohash index. Each geohash and the campaign ID may be stored as a key and a value, respectively, in the same fashion as in Step 525, with the exception that the geohashes and campaign ID are stored in the geohash index rather than the campaign index.

After Step 740 is completed, the process proceeds to end.

The following example is for explanatory purposes only and not intended to limit the scope of the invention. In other words, the following example is an example of one embodiment of the invention. Other embodiments may exist without departing from the scope of the invention.

Suppose that Adam operates Adam's Foods, a food truck in New York City. Adam desires to run a promotional campaign offering various appetizers free of charge between the hours of 3 p.m. and 4 p.m. Adam wants to advertise the promotion via smartphone to consumers located within a 30-yard radius of the food truck.

Adam enters into an arrangement with Chirper, a cellular service provider, to broadcast his ads to users of the service. Chirper explains to Adam that, to conserve resources, Chirper intends to approximate his geofence using geohash(es). Adam agrees and submits his advertisement along with geometric data for his desired geofence to Chirper, which Chirper stores with other campaign content on its database.

Initially, Chirper stores campaign metadata for the campaign in its database. Chirper assigns Adam's campaign the campaign ID "Adam001." At exactly 3 p.m., Chirper enters "Adam001", "40.715, −74.009" (the current location of Adam's food truck expressed in latitude and longitude), and a buffer of 30 yards into a metadata table on its database. Chirper generates a geohash grid having a 7-character granularity, corresponding to geohashes of roughly one New York City block. Chirper generates a circle from the campaign metadata above, having a radius of 30 yards surrounding the location of Adam's food truck. Chirper maps the generated circle onto the geohash grid to obtain a set of two geohashes that fully encompass the generated circle: {dr5regu, dr5reuh}. Chirper then stores the data pair "Adam001, {dr5regu, dr5reuh}" into a campaign index hashtable. Finally, Chirper generates a geohash index that includes at least the two entries "dr5regu, Adam001" and "dr5reuh, Adam001."

For the following hour, from 3-4 p.m., Chirper obtains a multitude of positions from its subscribers' mobile devices. Suppose that George is one such subscriber, and at 3:30 p.m., George is one block away from Adam's Foods. Chirper obtains George's position from the GPS receiver on George's mobile phone. Chirper converts the obtained position's latitude and longitude into binary, interleaves the bits, and the converts the result into base-32 to obtain a geohash value of "dr5reuha9blm3." Chirper accesses the geohash index on its database and searches for a matching geohash. The geohash corresponding to George's position is truncated one character at a time until a match is reached. In this case, George's position is truncated to "dr5reuh" and this value successfully matches an entry in the geohash index corresponding to Adam's campaign. Chirper obtains the campaign ID Adam001 from the geohash index, retrieves the advertisement associated with this campaign ID from the campaign content on its database, and sends the ad to George's cell phone. George then receives a notification that Adam's food truck is nearby and that George can eat free for the next 30 minutes.

The following day, at 3 p.m. Chirper obtains the current position of Adam's food truck by pinging the cook's mobile phone. The position is "40.736, −73.982". Chirper stores this information in its campaign metadata. Chirper obtains the geohash grid used the previous day from its database.

Because Adam has moved, Chirper deletes the previous day's information from its indexes. Accordingly, Chirper retrieves the geohash set {dr5regu, dr5reuh} corresponding to the campaign ID "Adam001" from the campaign index on its database. After obtaining the geohash set, Chirper deletes the entire entry from the campaign index. Next, Chirper deletes the following two entries from the geohash index: "dr5regu, Adam001" and "dr5reuh, Adam001." At this point all information pertaining to Adam's prior location has been removed from the indexes.

Again, a 30-yard circle is generated around Adam's position and is mapped to the geohash grid. Chirper determines that the new geofence includes the geohash set {dr5rsrz, dr5rsxb}. The data pair "Adam001, {dr5rsrz, dr5rsxb}" is entered into the campaign index. Finally, the data pairs "dr5rsrz, Adam001" and "dr5rsxb, Adam001" are entered into the geohash index.

The invention is not limited to the processes or examples described above. In one or more embodiments of the invention, the system may be used to send a notification unrelated to an advertising campaign to one or more mobile devices. For example, for users that want to share information or host events, they may use geofencing to broadcast such information.

One or more embodiments of the invention may be used to build a moving or changing geofence that is updated in real-time in response to the movement of, for example, the mobile device. For example, let Adam's truck from the above example be an ice cream truck rather than a food truck. Adam's ice cream truck continuously moves around New York city. Adam desires to generate notifications to users within a radius of the ice cream truck that updates in real-time. The system described in the above example may be modified so that the geohash and campaign indexes are updated to track the position of Adam's truck every second, rather than every day, thus approximating a real-time moving geofence.

One or more embodiments of the invention may also be used to send a notification from a mobile device to another mobile device or to a remote server. A client may desire to implement the invention so that the client is notified once a target mobile device leaves a geofenced area. For example, if a tiger wearing or implanted with such a device escapes a zoo, a subscriber may receive notification that the tiger has escaped along with the tiger's real-time tracking info. The target mobile device may include one or more components of the invention, including a GPS receiver, a dynamic geofence application, and/or a data repository including one or more of the data structures described above. In one or more embodiments of the invention, the geofence and campaign indexes may include paired index entries relating one or more geohashes to a subscriber ID rather than a campaign ID.

One or more embodiments of the invention may generate a geofence corresponding to geohashes outside a geometry, rather than corresponding to geohashes within a geometry. In the previous example, building a geofence from geohashes outside a geometry allows a notification to be sent to a subscriber once the tiger leaves the geofence and the geohash value generated from the tiger's new position matches the geohash index entry corresponding to the subscriber ID. One or more embodiments of the invention may then provide an escape notification from the mobile device equipped on the tiger to a remote mobile device belonging to the subscriber and/or to a remote server.

Figure 9:
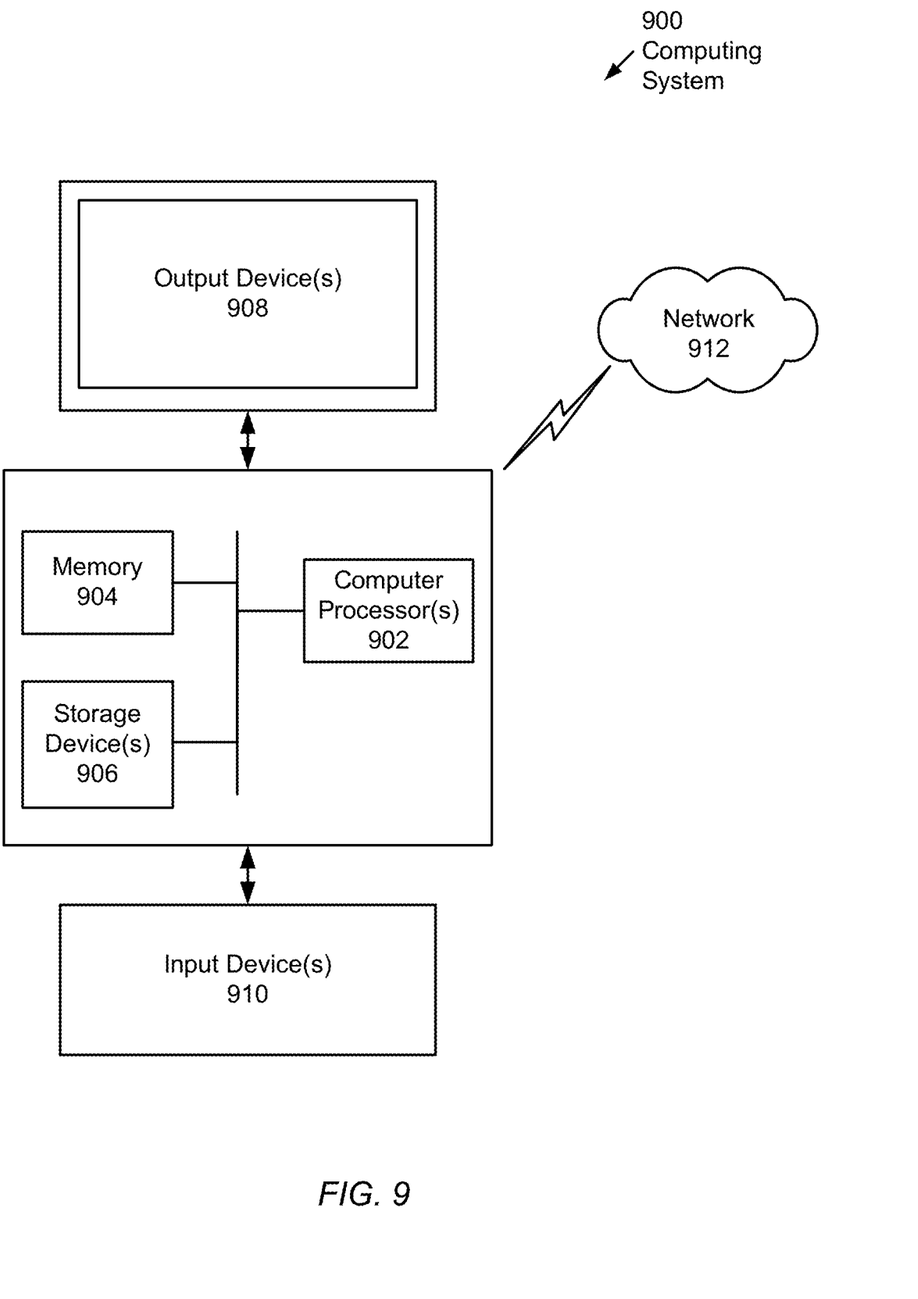
FIG. 9 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (914) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and connected to the other elements over a network (914). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dynamic geohash-based geofencing within a geographic area, comprising:
    obtaining metadata including a campaign identifier and geometric data;
    generating a geometry using the geometric data;
    mapping the geometry to a geohash grid to obtain a first geohash set including a first geohash in the geohash grid;
    storing the first geohash and the campaign identifier in a first entry in a geohash index, wherein the first entry includes a first key-value pair, wherein the first geohash corresponds to a key in the key-value pair and the campaign identifier corresponds to a value in the first key-value pair;
    obtaining a user position within the geographic area from a mobile device;
    generating a user geohash using the user position;
    looking up, using the user geohash, and finding the first entry in the geohash index, wherein the user geohash matches the first geohash;
    obtaining, in response to the looking up, the campaign identifier from the first entry in the geohash index;
    providing content corresponding to the campaign identifier to the mobile device;
    obtaining new geometric data associated with the campaign identifier;
    looking up, using the new geometric data, a second geohash in the geohash grid;
    storing the second geohash and the campaign identifier in a second entry in the geohash index, wherein the second entry includes a second key-value pair, wherein the second geohash corresponds to a key in the second key-value pair and the campaign identifier corresponds to a value in the second key-value pair; and
    removing all entries in the geohash index that include any member of the first geohash set as a key and the campaign identifier as a value.

2. The method of claim 1, wherein the geometric data includes a buffer and at least one selected from the group consisting of a point, a line, and a polygon.

3. The method of claim 1, wherein the geometric data is based on a current position of a second mobile device.

4. The method of claim 1, wherein a granularity of the geohash grid is determined, at least in part, based on a population density of the geographic area.

5. The method of claim 1, wherein the geohash index is a hash table.

6. A system for dynamic geohash-based geofencing within a geographic area, comprising:
    memory; and
    a computer processor for executing a dynamic geofencing application stored in memory and causing the computer processor to:
        obtain metadata including a campaign identifier and geometric data;
        generate a geometry using the geometric data;
        map the geometry to a geohash grid to obtain a first geohash set including a first geohash in the geohash grid;
        store the first geohash and the campaign identifier in a first entry in a geohash index, wherein the first entry includes a first key-value pair, wherein the first geohash corresponds to a key in the first key-value pair and the campaign identifier corresponds to a value in the first key-value pair;
        obtain a user position within the geographic area from a mobile device;
        generate a user geohash using the user position;
        look up, using the user geohash, and find the first entry in the geohash index, wherein the user geohash matches the first geohash;
        obtain, in response to the look up, the campaign identifier from the first entry in the geohash index;
        provide content corresponding to the campaign identifier to the mobile device;
        obtain new geometric data associated with the campaign identifier;
        look up, using the new geometric data, a second geohash in the geohash grid;
        store the second geohash and the campaign identifier in a second entry in the geohash index, wherein the second entry includes a second key-value pair, wherein the second geohash corresponds to a key in the second key-value pair and the campaign identifier corresponds to a value in the second key-value pair; and
        remove all entries in the geohash index that include any member of the first geohash set as a key and the campaign identifier as a value.

7. The system of claim 6, wherein the geometric data comprises includes a buffer and at least one selected from the group consisting of a point, a line, and a polygon.

8. The system of claim 6, wherein the geometric data is based on a current position of a second mobile device.

9. The system of claim 6, wherein a granularity of the geohash grid is determined, at least in part, based on a population density of the geographic area.

10. The system of claim 6, wherein the geohash index is a hash table.

11. A non-transitory computer readable medium storing instructions for dynamic geohash-based geofencing within a geographic area, the instructions comprising functionality to:
obtain metadata including a campaign identifier and geometric data;
generate a geometry using the geometric data;
map the geometry to a geohash grid to obtain a first geohash set including a first geohash in the geohash grid;
store the first geohash and the campaign identifier in a first entry in a geohash index, wherein the first entry includes a first key-value pair, wherein the first geohash corresponds to a key in the first key-value pair and the campaign identifier corresponds to a value in the first key-value pair;
obtain a user position within the geographic area from a mobile device;
generate a user geohash using the user position;
look up, using the user geohash, and find the first entry in the geohash index, wherein the user geohash matches the first geohash;
obtain, in response to the look up, the campaign identifier from the first entry in the geohash index;
provide content corresponding to the campaign identifier to the mobile device;
obtain new geometric data associated with the campaign identifier;
look up, using the new geometric data, a second geohash in the geohash grid;
store the second geohash and the campaign identifier in a second entry in the geohash index, wherein the second entry includes a second key-value pair, wherein the second geohash corresponds to a key in the second key-value pair and the campaign identifier corresponds to a value in the second key-value pair; and
remove all entries in the geohash index that include any member of the first geohash set as a key and the campaign identifier as a value.

12. The non-transitory computer readable medium of claim 11, wherein the geometric data includes a buffer and at least one selected from the group consisting of a point, a line, and a polygon.

13. The non-transitory computer readable medium of claim 11, wherein the geometric data is based on a current position of a second mobile device.

14. The non-transitory computer readable medium of claim 11, wherein a granularity of the geohash grid is determined, at least in part, based on a population density of the geographic area.

15. The non-transitory computer readable medium of claim 11, wherein the geohash index is a hash table.

16. The non-transitory computer readable medium of claim 11, wherein the geometric data is changed in real-time.

17. A method for dynamic geohash-based geofencing within a geographic area, comprising:
obtaining metadata including a subscriber identifier and geometric data;
generating a geometry using the geometric data;
mapping the geometry to a geohash grid to obtain a geohash set comprising a first geohash in the geohash grid;
storing the geohash and the subscriber identifier in an entry in a geohash index, wherein the entry includes a key-value pair, wherein the geohash corresponds to a key in the key-value pair and the subscriber identifier corresponds to a value in the key-value pair;
obtaining a position of a first mobile device within the geographic area;
generating a device geohash using the position;
looking up, using the device geohash, and finding the entry in the geohash index, wherein the device geohash matches the geohash;
obtaining, in response to the looking up, the subscriber identifier from the entry in the geohash index; and
providing a notification to a second mobile device corresponding to the subscriber identifier.

18. A method for dynamic geohash-based geofencing, comprising:
storing a first entry in a geohash index, wherein the first entry includes a first key-value pair, wherein a first geohash in a geohash grid corresponds to a key in the first key-value pair and a campaign identifier corresponds to a value in the first key-value pair;
generating, using a user position from a mobile device, a user geohash;
performing a lookup, using the user geohash, and finding the first entry in the geohash index, wherein the user geohash matches the first geohash;
providing, in response to the lookup, content corresponding to the campaign identifier to the mobile device, wherein the campaign identifier is obtained from the first entry;
after the providing:
receiving new geometric data associated with the campaign identifier;
updating the geohash index in response to receiving the new geometric data, wherein
updating the geohash index includes:
storing a second entry in the geohash index, wherein the second entry includes a second key-value pair, wherein a second geohash in the geohash grid corresponds to a key in the second key-value pair and the campaign identifier corresponds to a value in the second key-value pair, wherein the second geohash is determined using the new geometric data; and
removing all entries in the geohash index that include the first geohash.

* * * * *